(12) United States Patent
Amman et al.

(10) Patent No.: US 11,404,061 B1
(45) Date of Patent: Aug. 2, 2022

(54) SPEECH FILTERING FOR MASKS

(71) Applicant: Ford Global Technologies, LLC, Dearborn, MI (US)

(72) Inventors: Scott Andrew Amman, Milford, MI (US); Cynthia M. Neubecker, Westland, MI (US); Joshua Wheeler, Trenton, MI (US); Pietro Buttolo, Dearborn Heights, MI (US); Brian Bennie, Sterling Heights, MI (US); John Robert Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 101 days.

(21) Appl. No.: 17/145,431

(22) Filed: Jan. 11, 2021

(51) Int. Cl.
| | | |
|---|---|---|
| *G10L 15/22* | (2006.01) | |
| *G10L 15/07* | (2013.01) | |
| *G06V 20/59* | (2022.01) | |

(52) U.S. Cl.
CPC ............. *G10L 15/22* (2013.01); *G06V 20/59* (2022.01); *G10L 15/07* (2013.01); *G10L 2015/223* (2013.01)

(58) Field of Classification Search
CPC ... G10L 15/22; G10L 15/07; G10L 2015/223; G06V 20/59
USPC ........................................................ 704/275
See application file for complete search history.

(56) References Cited

U.S. PATENT DOCUMENTS

| | | | | |
|---|---|---|---|---|
| 7,254,535 | B2* | 8/2007 | Kushner | B63C 11/26 704/226 |
| 10,140,089 | B1* | 11/2018 | Paranjpe | G10L 19/0018 |
| 2001/0012373 | A1* | 8/2001 | Graumann | H04R 5/023 381/364 |
| 2001/0021905 | A1* | 9/2001 | Burnett | G10L 13/04 704/E15.041 |
| 2003/0027600 | A1* | 2/2003 | Krasny | G10L 21/0208 455/564 |
| 2003/0177007 | A1* | 9/2003 | Kanazawa | G10L 15/20 704/233 |
| 2003/0223622 | A1* | 12/2003 | Simon | H04N 1/62 382/118 |
| 2004/0167776 | A1* | 8/2004 | Go | G10L 19/0208 704/208 |
| 2004/0181399 | A1* | 9/2004 | Gao | G10L 19/005 704/E21.011 |
| 2004/0254793 | A1* | 12/2004 | Herley | G10L 13/00 704/E13.008 |
| 2006/0009970 | A1* | 1/2006 | Harton | 704/231 |

(Continued)

FOREIGN PATENT DOCUMENTS

| | | |
|---|---|---|
| CN | 111444869 A | 7/2020 |
| JP | 2009265722 A | 11/2009 |

*Primary Examiner* — Thuykhanh Le
(74) *Attorney, Agent, or Firm* — Frank Lollo; Bejin Bieneman PLC

(57) ABSTRACT

A computer includes a processor and a memory storing instructions executable by the processor to receive sensor data of an occupant of a vehicle, identify a type of mask worn by the occupant based on the sensor data, select a sound filter according to the type of mask from a plurality of sound filters stored in the memory, receive sound data, apply the selected sound filter to the sound data, and perform an operation using the filtered sound data.

20 Claims, 4 Drawing Sheets

(56) References Cited

U.S. PATENT DOCUMENTS

| | | | |
|---|---|---|---|
| 2006/0009971 A1* | 1/2006 | Kushner | G10L 21/0216 |
| | | | 704/231 |
| 2007/0163588 A1* | 7/2007 | Hebrank | A61M 16/0069 |
| | | | 128/205.29 |
| 2010/0110489 A1* | 5/2010 | Kanda | G10L 15/26 |
| | | | 358/1.15 |
| 2011/0036347 A1* | 2/2011 | Morgan, III | A62B 18/025 |
| | | | 128/201.19 |
| 2012/0008002 A1* | 1/2012 | Bigioi | H04N 9/67 |
| | | | 348/222.1 |
| 2012/0166188 A1* | 6/2012 | Chakra | G10L 21/0208 |
| | | | 704/226 |
| 2012/0191447 A1* | 7/2012 | Joshi | G10L 21/02 |
| | | | 704/226 |
| 2015/0012270 A1* | 1/2015 | Reynolds | G10L 25/84 |
| | | | 704/233 |
| 2015/0221299 A1* | 8/2015 | Matula | H04M 3/5175 |
| | | | 704/249 |
| 2018/0253590 A1* | 9/2018 | Lloyd | G01N 33/4833 |
| 2018/0369616 A1* | 12/2018 | Dobbing | A62B 18/088 |
| 2019/0121532 A1* | 4/2019 | Strader | G16H 10/20 |
| 2020/0109869 A1* | 4/2020 | Mäkipää | B01D 53/8687 |
| 2021/0004982 A1* | 1/2021 | Spooner | G06T 5/002 |
| 2021/0117649 A1* | 4/2021 | Gonzalez Aguirre | |
| | | | G06V 40/168 |
| 2021/0343400 A1* | 11/2021 | Inam | G16H 40/67 |
| 2021/0368881 A1* | 12/2021 | Abbondanzio | A62B 23/025 |
| 2022/0012894 A1* | 1/2022 | Lev | G01J 5/00 |
| 2022/0139388 A1* | 5/2022 | Sharifi | G10L 15/02 |
| | | | 704/231 |

* cited by examiner

SPEECH FILTERING FOR MASKS

BACKGROUND

Many modern vehicles include voice-recognition systems. Such a system includes a microphone. The system converts spoken words detected by the microphone into text or another form to which a command can be matched. Recognized commands can include adjusting climate controls, selecting media to play, etc.

DETAILED DESCRIPTION

Figure 1:
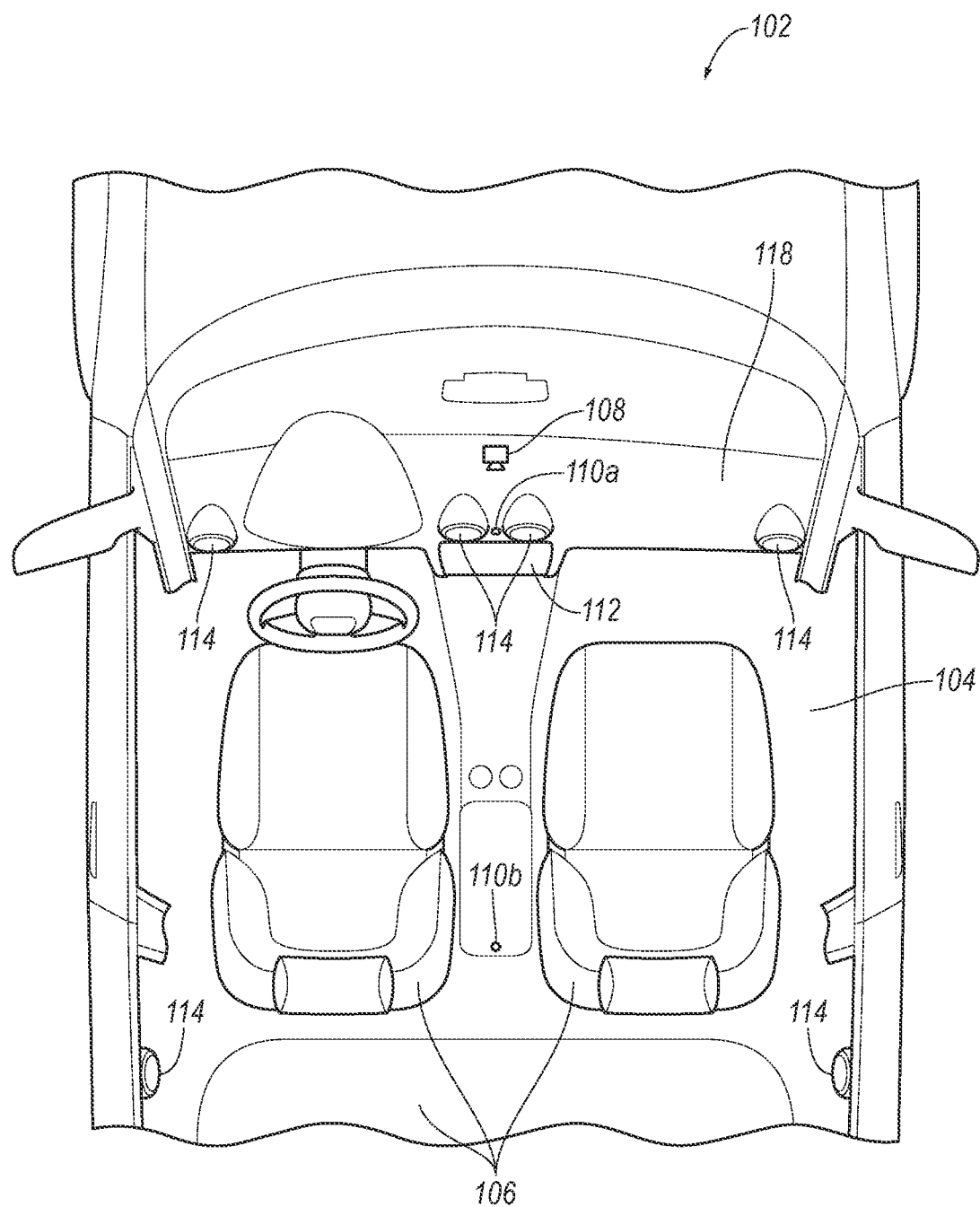
FIG. 1 is a top view of an example vehicle with a passenger cabin exposed for illustration.

A computer includes a processor and a memory storing instructions executable by the processor to receive sensor data of an occupant of a vehicle, identify a type of mask worn by the occupant based on the sensor data, select a sound filter according to the type of mask from a plurality of sound filters stored in the memory, receive sound data, apply the selected sound filter to the sound data, and perform an operation using the filtered sound data.

The sensor data may be image data showing the occupant.

The operation may be identifying a voice command to activate a feature.

The operation may be transmitting the filtered sound data in a telephone call.

The operation may be outputting the filtered sound data by a speaker of the vehicle.

The instructions may include instructions to perform the operation using the sound data unfiltered upon determining that the occupant is not wearing a mask.

The instructions may include selecting a generic sound filter from the plurality of sound filters upon identifying the type of mask as an unknown type. The instructions may include instructions to transmit an update to a remote server upon identifying the type of mask as the unknown type. The update may include image data of the mask.

The instructions may include instructions to identify the type of mask worn by the occupant based on an input by the occupant. The instructions may include instructions to override the identification based on the sensor data with the identification based on the input upon receiving the input.

The instructions may include instructions to prompt the occupant to provide the input upon determining that the occupant is wearing a mask.

The instructions may include instructions to prompt the occupant to provide the input upon determining that one of the occupant is wearing a mask with a type identified with a confidence score below a confidence threshold or the type of the mask is an unknown type.

The instructions may include instructions to transmit an update to a remote server in response to the input indicating that the type of the mask is not among the types of masks stored in the memory.

The instructions may include instructions to choose the occupant for which to identify the type of mask from a plurality of occupants based on volumes of sound data from respective microphones.

The instructions may include instructions to choose the occupant for which to identify the type of mask from a plurality of occupants based on the occupant being in a predesignated region of the image data.

Each sound filter may adjust a volume of the sound data by an amount that varies depending on frequency. Each sound filter increases the volume of the sound data at at least one frequency.

The instructions may include instructions to receive an update from a remote server changing the plurality of sound filters stored in the memory.

A method includes receiving sensor data of an occupant of a vehicle, identifying a type of mask worn by the occupant based on the sensor data, selecting a sound filter according to the type of mask from a plurality of sound filters stored in memory, receiving sound data, applying the selected sound filter to the sound data, and performing an operation using the filtered sound data.

With reference to the Figures, a computer 100 includes a processor and a memory storing instructions executable by the processor to receive sensor data of an occupant of a vehicle 102, identify a type of mask worn by the occupant based on the sensor data, select a sound filter according to the type of mask from a plurality of sound filters stored in the memory, receive sound data, apply the selected sound filter to the sound data, and perform an operation using the filtered sound data.

The computer 100 can be used to boost the clarity of speech from an occupant wearing a mask by selecting the type of mask and thereby applying the filter most appropriate to equalize the speech. The choice of filter permits the frequencies muffled by that particular mask to be amplified. The filtered sound data can thus reliably be used to perform operations such as a voice command to activate a feature of the vehicle 102, a transmission in a telephone call, or broadcasting as a telecom to a speaker 114 elsewhere in the vehicle 102. The voice command can be reliably recognized, the telephone call can be reliably understood by the person at the other end from the occupant, and the telecom message can be reliably understood by the other occupant of the vehicle 102.

With reference to FIG. 1, the vehicle 102 may be any suitable type of automobile, e.g., a passenger or commercial automobile such as a sedan, a coupe, a truck, a sport utility, a crossover, a van, a minivan, a taxi, a bus, etc. The vehicle 102, for example, may be autonomous. In other words, the vehicle 102 may be autonomously operated such that the vehicle 102 may be driven without constant attention from a driver, i.e., the vehicle 102 may be self-driving without human input.

The vehicle 102 includes a passenger cabin 104 to house occupants of the vehicle 102. The passenger cabin 104 includes one or more front seats 106 disposed at a front of the passenger cabin 104 and one or more back seats 106 disposed behind the front seats 106. The passenger cabin 104 may also include third-row seats 106 (not shown) at a rear of the passenger cabin 104.

The vehicle 102 includes at least one camera 108. The camera 108 can detect electromagnetic radiation in some range of wavelengths. For example, the camera 108 may detect visible light, infrared radiation, ultraviolet light, or some range of wavelengths including visible, infrared, and/or ultraviolet light. For example, the camera 108 can be a thermal imaging camera.

The camera 108 is positioned so that a field of view of the camera 108 encompasses at least one of the seats 106, e.g., the driver seat 106, or the front and back seats 106. For example, the camera 108 can be positioned on an instrument panel 118 or rear-view mirror and oriented rearward relative to the passenger cabin 104.

The vehicle 102 includes at least one microphone 110, e.g., a first microphone 110a and a second microphone 110b. The microphones 110 are transducers that convert sound into an electrical signal. The microphones 110 can be any suitable type of microphones for detecting speech by occupants of the vehicle 102, e.g., dynamic, condenser, contact, etc.

The microphones 110 can be arranged at respective locations or positions in the passenger cabin 104 to collectively detect speech from occupants in different seats 106. For example, the first microphone 110a can be positioned in the instrument panel 118, and the second microphone 110b can be positioned between the front seats 106 and oriented to pick up sound from the back seats 106.

A user interface 112 presents information to and receives information from an occupant of the vehicle 102. The user interface 112 may be located, e.g., on the instrument panel 118 in the passenger cabin 104, or wherever it may be readily seen by the occupant. The user interface 112 may include dials, digital readouts, screens, speakers 114, and so on for providing information to the occupant, e.g., human-machine interface (HMI) elements such as are known. The user interface 112 may include buttons, knobs, keypads, the microphones 110, and so on for receiving information from the occupant.

The speakers 114 are electroacoustic transducers that convert an electrical signal into sound. The speakers 114 can be any suitable type for producing sound audible to the occupants, e.g., dynamic. The speakers 114 can be arranged at respective locations or positions in the passenger cabin 104 to collectively produce sound for occupants in respective seats 106.

Figure 2:
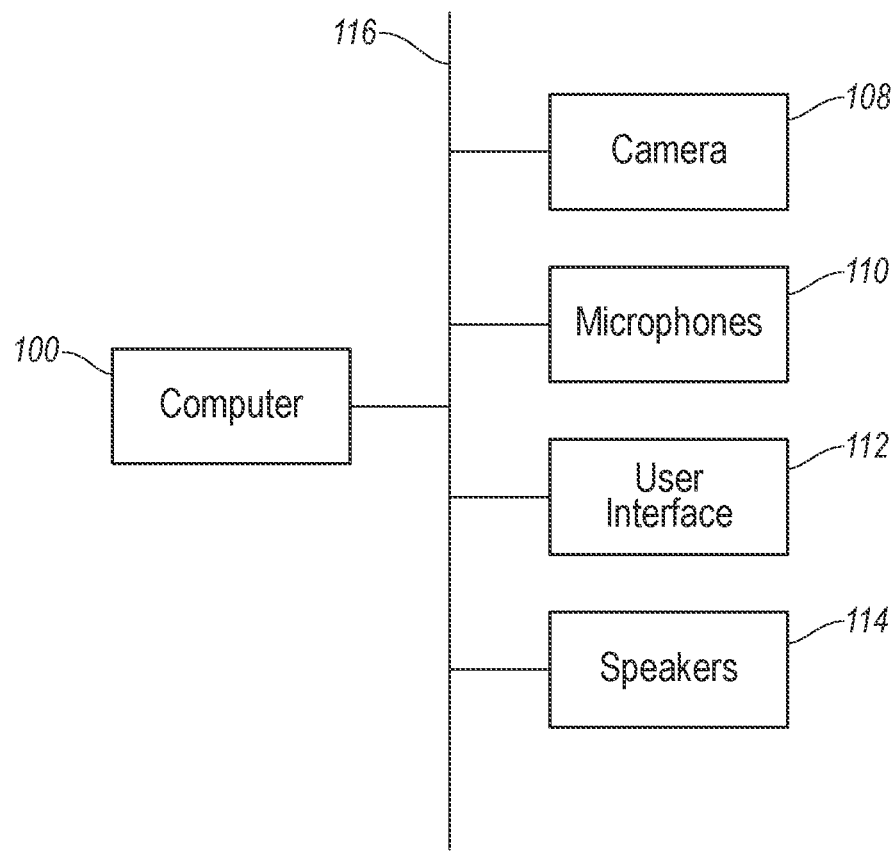
FIG. 2 is a block diagram of a system of the vehicle.

With reference to FIG. 2, the computer 100 is a microprocessor-based computing device, e.g., a generic computing device including a processor and a memory, an electronic controller or the like, a field-programmable gate array (FPGA), an application-specific integrated circuit (ASIC), etc. The computer 100 can thus include a processor, a memory, etc. The memory of the computer 100 can include media for storing instructions executable by the processor as well as for electronically storing data and/or databases, and/or the computer 100 can include structures such as the foregoing by which programming is provided. The computer 100 can be multiple computers coupled together.

The computer 100 may transmit and receive data through a communications network 116 such as a controller area network (CAN) bus, Ethernet, WiFi®, Local Interconnect Network (LIN), onboard diagnostics connector (OBD-II), and/or by any other wired or wireless communications network. The computer 100 may be communicatively coupled to the camera 108, the microphones 110, the user interface 112, the speakers 114, a transceiver 118, and other components via the communications network 116.

The transceiver 118 may be connected to the communications network. The transceiver 118 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g, other RF (radio frequency) communications, etc. The transceiver 118 may be adapted to communicate with a remote server 120, that is, a server distinct and spaced from the vehicle 102. The remote server 120 may be located outside the vehicle 102. For example, the remote server 120 may be associated with another vehicle (e.g., V2V communications), an infrastructure component (e.g., V2I communications via Dedicated Short-Range Communications (DSRC) or the like), an emergency responder, a mobile device associated with the owner of the vehicle 102, etc. The transceiver 118 may be one device or may include a separate transmitter and receiver.

Figure 4:
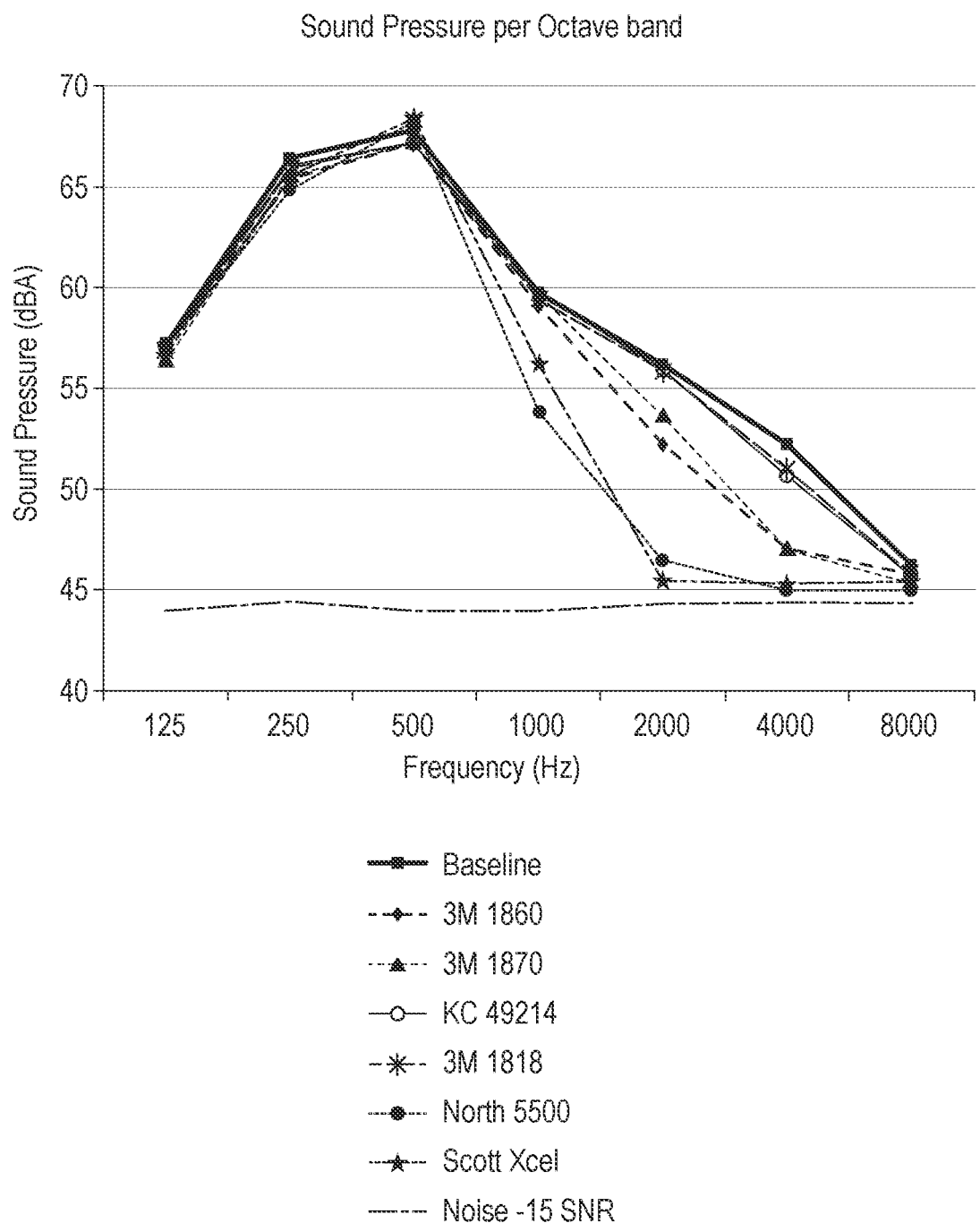
FIG. 4 is a plot of sound pressure versus frequency for speech while wearing a mask for a plurality of masks.

With reference to FIG. 4, the computer 100 stores a plurality of sound filters in memory. Each sound filter specifies how much to adjust a sound pressure, i.e., volume, of sound data according to a frequency, e.g., each sound filter provides sound pressure as a mathematical function of frequency, SP=F(f), in which SP is sound pressure, F is the sound filter, and f is frequency. The sound filter $F_i$ can be a difference of a baseline sound pressure $SP_{base}$ and a sound pressure for a type of mask $SP_i$, i.e., $F_i(f)=SP_{base}(f)-SP_i(f)$, in which i is an index of the type of mask. Masks often have a small effect on volume when the frequency is 500 Hz or less and muffle sounds more considerably at 1000 Hz and higher to an extent that depends on the type of mask. One of the sound filters stored in memory is associated with the unknown type of mask, and that sound filter can be a generic sound filter, e.g., an average of the other sound filters stored in memory.

The sound filters stored in memory can be updated from the remote server 120, e.g., an over-the-air (OTA) update via the transceiver 118. An update can add new sound filters for a new type of mask for which a sound filter is not already stored by the computer 100. Alternatively or additionally, the update can change one or more of the sound filters already stored by the computer 100. Thus, the sound filters stored by the computer 100 can be updated as new types of masks are introduced, materials of existing masks change, etc. The update can occur periodically or on demand.

Figure 3:
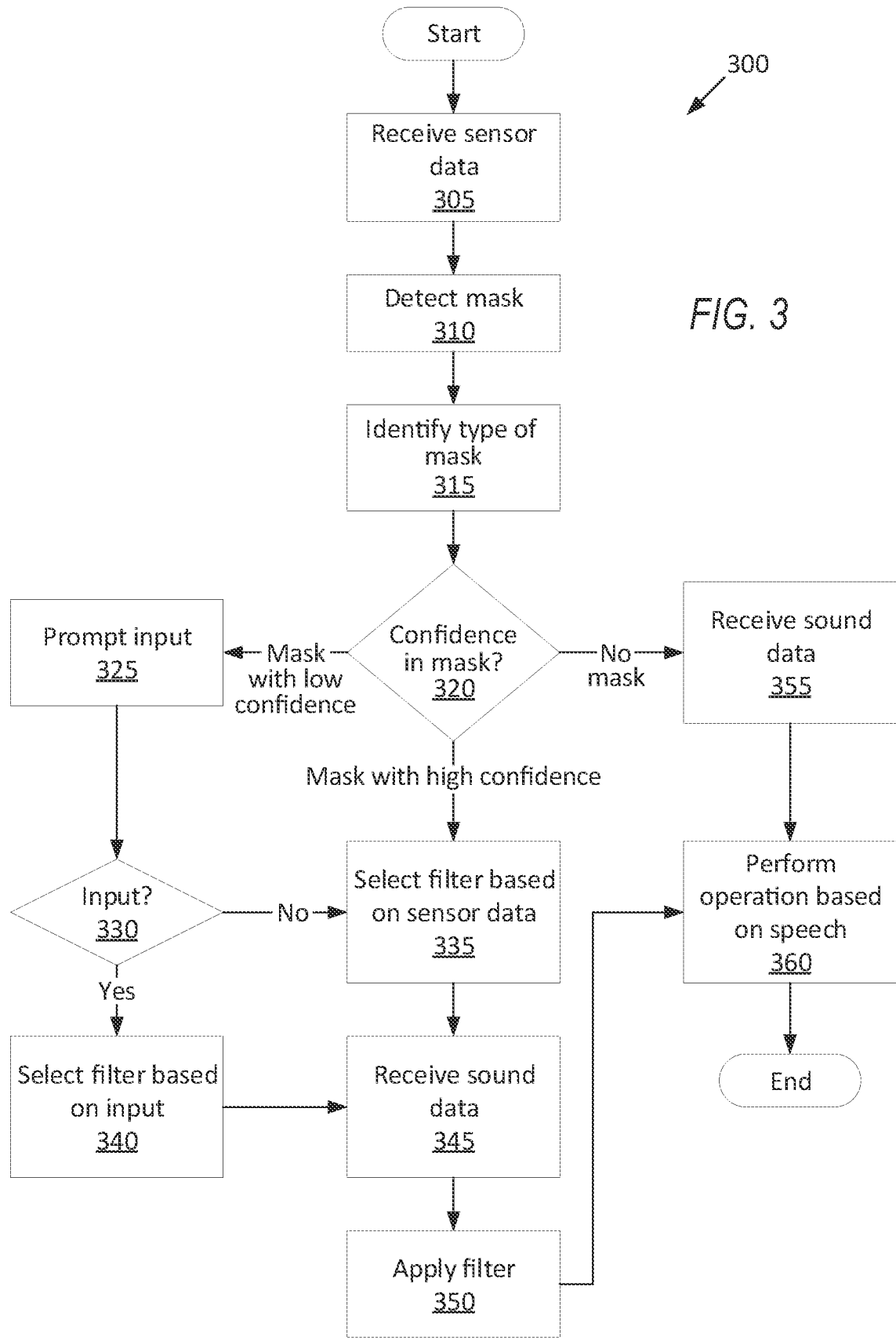
FIG. 3 is a process flow diagram of an example process for filtering speech of an occupant of the vehicle wearing a mask.

FIG. 3 is a process flow diagram illustrating an exemplary process 300 for filtering speech of an occupant of the vehicle 102 wearing a mask. The memory of the computer 100 stores executable instructions for performing the steps of the process 300 and/or programming can be implemented in structures such as mentioned above. As a general overview of the process 300, the computer 100 receives data from the camera 108 and the microphones 110, detects a mask worn by an occupant based on the data, and identifies the type of the mask. If the occupant is wearing a mask of a type identified with a confidence score above a confidence threshold, the computer 100 selects a sound filter corresponding to the type of mask. If the occupant is wearing a mask of a type identified with a confidence score above a confidence threshold, the computer 100 prompts input from the occupant about the type of mask and selects a sound filter corresponding to the type of mask either inputted by the occupant or identified by the computer 100. The computer 100 applies the selected sound filter to sound data, and performs an operation using the filtered sound data. If there are no masks, the computer 100 performs the operation based on the unfiltered sound data.

The process 300 begins in a block 305, in which the computer 100 receives sensor data of at least one occupant of the vehicle 102, e.g., image data from the camera 108 showing the occupants and/or sound data from the microphones 110 of speech by the occupants.

Next, in a block 310, the computer 100 detects a mask worn by one of the occupants. If a plurality of occupants are in the passenger cabin 104, the computer 100 chooses one of the occupants. For example, the computer 100 can choose the occupant based on the occupant being in a predesignated region of the image data, e.g., corresponding to an occupant sitting in a particular seat 106 such as an operator seat 106, and then detect the mask worn by that occupant. This can permit the computer 100 to detect a mask worn by the operator of the vehicle 102. For another example, the computer 100 can choose the occupant based on volumes of sound data from the respective microphones 110, e.g., based on the microphone 110 with the highest volume, and then detect the mask worn by the occupant closest to that microphone 110. This can permit the computer 100 to detect a mask worn by an occupant most likely to be speaking for performing the operation, e.g., an occupant sitting in the back seat 106 when the volume from the microphone 110b is greater than from the microphone 110a. The computer 100 can identify the mask or unmasked face using conventional image-recognition techniques, e.g., a convolutional neural network programmed to accept images as input and output an identified mask presence or absence. The image data from the camera 108 can be used as the input. The convolutional neural network can use images of occupants of vehicles wearing and not wearing masks produced by cameras situated in the same location as the camera 108. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a down-sampling operation along spatial dimensions; and fully connected layers, which generate outputs based on the output of all neurons of the previous layer. The final layer of the convolutional neural network generates a confidence score for mask and for unmasked face, and the final output is whichever of mask or unmasked face has the highest confidence score. For the purposes of this disclosure, a "confidence score" is a measure of a probability that the identification is correct. The identification of an occupant face as masked or unmasked can be performed for respective occupants in the passenger cabin 104. Alternatively or additionally, the computer 100 may detect masks worn by multiple occupants.

Next, in a block 315, the computer 100 identifies the types of masks worn by the occupants. The computer 100 can execute a convolutional neural network as described above for each detected mask using the image data, and the output is the type of mask with the highest confidence score for each occupant. The convolutional neural network can operate on the image data of the mask, or alternatively on image data of a logo on the mask. The types of masks can be specified by, e.g., manufacturer and model, e.g., 3M 1860, 3M 1870, Kimberly-Clark 49214, Scott Xcel, etc. One of the possible types of masks is an unknown type, i.e., a mask that is none of the masks stored in memory. Alternatively, a single convolutional neural network can be executed for the blocks 310 and 315, and the output for each occupant is one of the types of masks, the unknown type, or unmasked face, whichever has the highest confidence score. Alternatively or additionally, the computer 100 may identify types of masks (or unmasked face) worn by multiple occupants. If the identification of the type of mask is the unknown type, the computer 100 transmits an update to the remote server 120 via the transceiver 118. The update can include the image data showing the mask of unknown type.

Next, in a decision block 320, the computer 100 determines whether the occupant is wearing a mask, i.e., whether the output of the convolutional neural network(s) is mask and/or a type of mask for the occupant, and the computer 100 determines whether the confidence score of the type of mask is above a confidence threshold. The confidence threshold can be chosen to indicate a high likelihood that the type of mask is correctly identified. Upon determining that the occupant is wearing a mask and that the confidence score for the type of mask is below the threshold score (or if the identified type of mask is the unknown type), the process 300 proceeds to a block 325. Upon determining that the occupant is wearing a mask and that the confidence score for the type of mask is above the threshold score, the process 300 proceeds to a block 335. Upon determining that the occupant is not wearing a mask, the process 300 proceeds to a block 355.

In the block 325, the computer 100 prompts the occupants to provide an input through the user interface 112 specifying a type of mask that the occupant is wearing. For example, the user interface 112 can present a list of types of masks for the occupant to choose from. The list can be a default list stored in memory. Alternatively, the list can include the types of masks with the highest confidence scores as determined in the block 315, or the user interface 112 can display a single type of mask with the highest confidence score and ask the occupant to confirm that the type of mask is correct. The list can include an option, e.g., "other," for indicating that the type of the mask is not among the types of masks stored by the computer 100. Selecting this option can be treated as though the occupant selected that the type of the mask is the unknown type. When this option is selected, the computer 100 can transmit an update to the remote server 120 via the transceiver 118, if the computer 100 did not already do so in the block 315. The update can include the image data showing the mask of unknown type.

Next, in a decision block 330, the computer 100 determines whether the occupant inputted a type of mask in response to the prompt in the block 325. The occupant provides the input by selecting the type of mask from the list, and the occupant can fail to provide the input by selecting an option declining to provide a type of mask, e.g., an option labeled "Choose mask automatically," or by failing to select a type of mask within a time threshold. The time threshold can be chosen to provide the occupant sufficient time to response to the prompt. If the occupant did not select a type of mask, the process 300 proceeds to a block 335. If the occupant selected a type of mask, the process 300 proceeds to a block 340.

In the block 335, the computer 100 selects a sound filter according to the type of mask identified in the block 315 from the plurality of the sound filters stored in memory. Selecting from the plurality of sound filters can provide a sound filter that most accurately adjusts the sound data to the baseline level.

Alternatively, when the computer 100 has identified multiple types of masks, the computer 100 can select multiple sound filters, each associated with one of the identified types of masks. The computer 100 can combine the sound filters together, e.g., by simple averaging or by weighting. The sound filters can be weighted based on locations of the occupants wearing the masks relative to one of the microphones 110 generating sound data, e.g., based on volumes of the sound data from the respective microphones 110. If the first microphone 110a is generating sound data with greater volume than the second microphone 110b, then the sound filters are weighted according to relative distances of the masks of each type from the chosen microphone 110a. For example, if a mask of a type 1 is a distance $d_1$ from the chosen microphone 110a and a mask of a type 2 is a distance $d_2$ from the chosen microphone 110a, then the weights can be $w_1=d_1/(d_1+d_2)$ and $w_2=d_2/(d_1+d_2)$, and the combined sound filter can be $F_{combo}(f)=w_1*F_1(f)+w_2*F_2(f)$. After the block 335, the process 300 proceeds to a block 345.

In the block 340, the computer 100 identifies the type of mask based on the input by the occupant and selects the sound filter from memory associated with the identified type of mask. In other words, the computer 100 overrides the identification based on the image data or sound data with the identification based on the input upon receiving the input, by executing the block 340 instead of the block 335. After the block 340, the process 300 proceeds to a block 345.

In the block 345, the computer 100 receives sound data from the microphones 110. The sound data can include speech by the occupants.

Next, in a block 350, the computer 100 applies the selected sound filter or the combination of the selected sound filters to the sound data. The sound filter adjusts a volume of the sound data by an amount that varies depending on the frequency. For example, for each frequency f of the sound data, the sound filter adjusts the sound pressure, i.e., adjusts the volume, by the value of the sound filter for that frequency, e.g., $SP_{filt}(f)=F(t)+SP_{unfilt}(f)$. For example, the sound filter can adjust the volume only slightly when the frequency is 500 Hz or less and increase the volume more considerably at 1000 Hz and higher to an extent that depends on the type of mask. After the block 350, the process 300 proceeds to a block 360.

In the block 355, i.e., after not detecting any masks, the computer 100 receives sound data from the microphones 110. The sound data can include speech by the occupants. After the block 355, the process 300 proceeds to the block 360.

In the block 360, the computer 100 performs an operation using the sound data, either the filtered sound data from the block 350 or the unfiltered sound data from the block 355. For example, the operation can be identifying a voice command to activate a feature, e.g., converting the sound data into text such as "Call Pizza Place," "Play Podcast," "Decrease Temperature," etc. (or into equivalent data identifying the command) Using the filtered sound data can help the computer 100 to accurately identify the voice command. For another example, the operation can be transmitting the sound data in a telephone call. A mobile phone can be paired with the user interface 112 and used to place a telephone call. Using the filtered sound data can make it easy for the recipient of the call to understand what the occupant is saying. For another example, the operation can be outputting the filtered sound data by one or more of the speakers 114. Sound data originating from the first microphone 110 can be used and outputted by the speaker 114 at a rear of the passenger cabin 104; in other words, the first microphone 110 and the speaker 114 form a telecom. Using the filtered sound data can make it easier for an occupant in the back seat 106 to understand what the occupant in the front seat 106 is saying than directly hearing the occupant speaking while muffled by the mask. After the block 360, the process 300 ends.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer 100 readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data (e.g., instructions), which may be read by a computer. Such a medium may take many forms, including, but not limited to, nonvolatile media, volatile media, etc. Nonvolatile media include, for example, optical or magnetic disks and other persistent memory. Volatile media include dynamic random-access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

The disclosure has been described in an illustrative manner, and it is to be understood that the terminology which has been used is intended to be in the nature of words of description rather than of limitation. Use of "in response to" and "upon determining" indicates a causal relationship, not merely a temporal relationship. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A computer comprising a processor and a memory storing instructions executable by the processor to:
   receive sensor data of an occupant of a vehicle;
   identify a type of mask worn by the occupant based on the sensor data;
   select a sound filter according to the type of mask from a plurality of sound filters stored in the memory;
   receive sound data;
   apply the selected sound filter to the sound data; and
   perform an operation using the filtered sound data.

2. The computer of claim 1, wherein the sensor data is image data showing the occupant.

3. The computer of claim 1, wherein the operation is identifying a voice command to activate a feature.

4. The computer of claim 1, wherein the operation is transmitting the filtered sound data in a telephone call.

5. The computer of claim 1, wherein the operation is outputting the filtered sound data by a speaker of the vehicle.

6. The computer of claim 1, wherein the instructions include instructions to perform the operation using the sound data unfiltered upon determining that the occupant is not wearing a mask.

7. The computer of claim 1, wherein the instructions include instructions to select a generic sound filter from the plurality of sound filters upon identifying the type of mask as an unknown type.

8. The computer of claim 7, wherein the instructions include instructions to transmit an update to a remote server upon identifying the type of mask as the unknown type.

9. The computer of claim 8, wherein the update includes image data of the mask.

10. The computer of claim 1, wherein the instructions include instructions to identify the type of mask worn by the occupant based on an input by the occupant.

11. The computer of claim 10, wherein the instructions include instructions to override the identification based on the sensor data with the identification based on the input upon receiving the input.

12. The computer of claim 10, wherein the instructions include instructions to prompt the occupant to provide the input upon determining that the occupant is wearing a mask.

13. The computer of claim 10, wherein the instructions include instructions to prompt the occupant to provide the input upon determining that one of the occupant is wearing a mask with a type identified with a confidence score below a confidence threshold or the type of the mask is an unknown type.

14. The computer of claim 10, wherein the instructions include instructions to transmit an update to a remote server in response to the input indicating that the type of the mask is not among the types of masks stored in the memory.

15. The computer of claim 1, wherein the instructions include instructions to choose the occupant for which to identify the type of mask from a plurality of occupants based on volumes of sound data from respective microphones.

16. The computer of claim 1, wherein the instructions include instructions to choose the occupant for which to identify the type of mask from a plurality of occupants based on the occupant being in a predesignated region of the image data.

17. The computer of claim 1, wherein each sound filter adjusts a volume of the sound data by an amount that varies depending on frequency.

18. The computer of claim 17, wherein each sound filter increases the volume of the sound data at at least one frequency.

19. The computer of claim 1, wherein the instructions include instructions to receive an update from a remote server changing the plurality of sound filters stored in the memory.

20. A method comprising:
receiving sensor data of an occupant of a vehicle;
identifying a type of mask worn by the occupant based on the sensor data;
selecting a sound filter according to the type of mask from a plurality of sound filters stored in memory;
receiving sound data;
applying the selected sound filter to the sound data; and
performing an operation using the filtered sound data.

* * * * *